Aug. 7, 1956 V. HAENSEL 2,758,064
CATALYTIC REFORMING OF HIGH NITROGEN AND SULFUR CONTENT GASOLINE FRACTIONS
Filed May 26, 1951
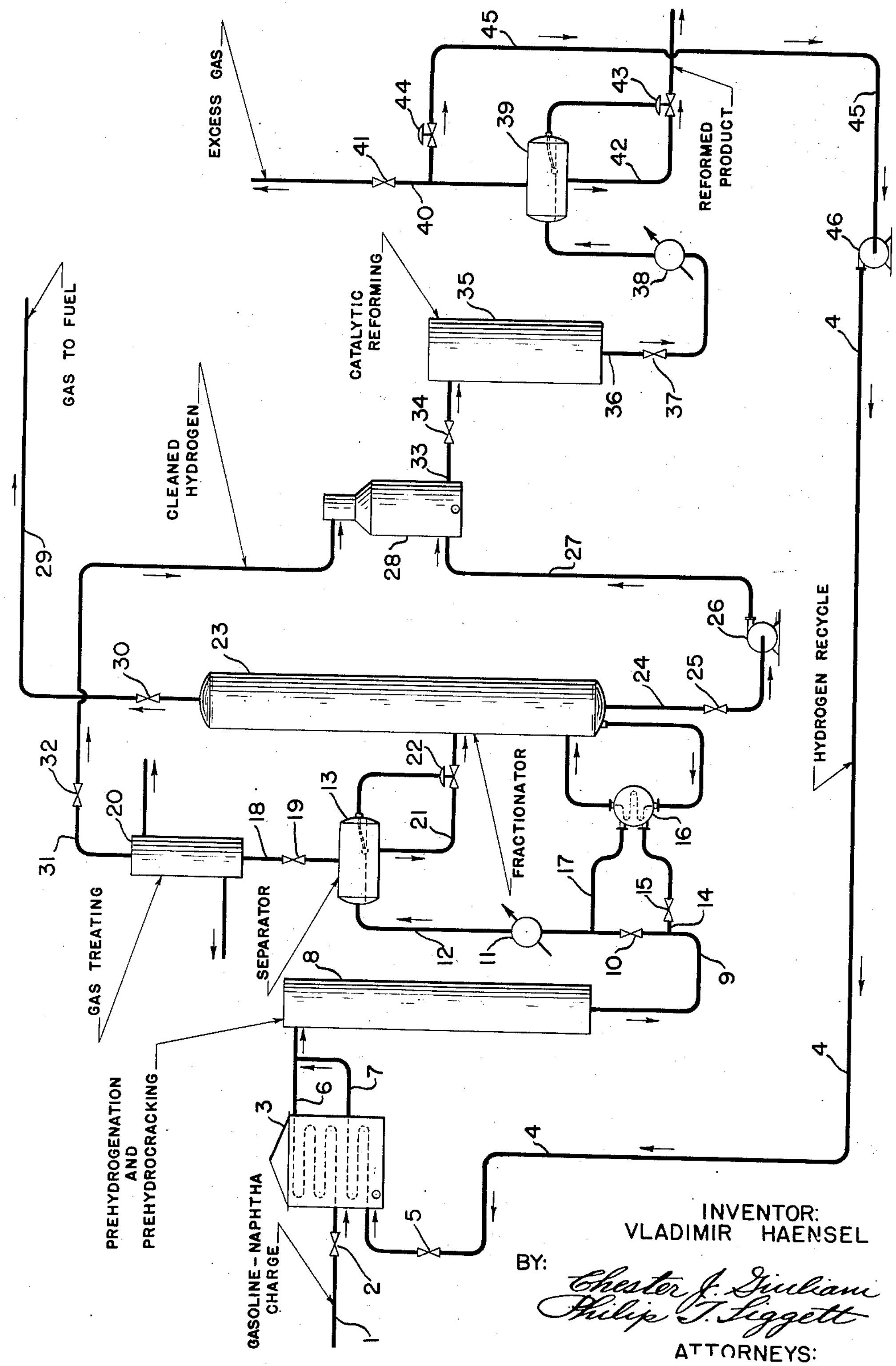
INVENTOR:
VLADIMIR HAENSEL
BY: Chester J. Giuliani
Philip T. Liggett
ATTORNEYS:

2,758,064
Patented Aug. 7, 1956

2,758,064

CATALYTIC REFORMING OF HIGH NITROGEN AND SULFUR CONTENT GASOLINE FRACTIONS

Vladimir Haensel, Hinsdale, Ill., assignor to Universal Oil Products Company, Chicago, Ill., a corporation of Delaware Application May 26, 1951, Serial No. 228,523

10 Claims. (Cl. 196—50)

This invention relates to an improved method for effecting the catalytic reforming of naphtha and gasoline fractions having a high nitrogen and sulfur content. More particularly, the improved process provides for the pre-treatment of gasoline fractions containing an excessive amount of sulfur and nitrogen compounds as well as olefins, whereby to remove the effects of these components prior to catalytic reforming.

It is particularly desirable to reform straight run and thermally cracked gasoline or naphtha fractions, either alone or in admixtures, since they generally exhibit relatively poor anti-knock characteristics, particularly the higher boiling fractions thereof. It has been found that catalytic reforming with a catalyst comprising platinum and alumina, and particularly platinum-alumina catalyst containing combined halogen, such as combined fluorine and/or chlorine, are especially useful in the reforming of saturated hydrocarbons. This type of catalyst effects desirable combined reactions including hydrocracking and isomerization of paraffins, and dehydrogenation of naphthenes to aromatics as principal reactions, and thus is particularly capable of increasing the octane number of such gasoline and naphtha fractions. The resulting octane numbers are values substantially higher than those that ordinarily can be reached by thermal reforming. By an appropriate selection of operation conditions, catalyst of this type can be used for a number of weeks and even months without regeneration, when processing saturated or substantially normal gasoline fractions.

However, when effecting the advantageous catalytic reforming operation, with platinum-alumina and combined halogen catalysts, those stocks which have a relatively high amount of sulfur or nitrogen, including "coker" stocks having a high content of sulfur, nitrogen compounds, and olefins, there results a certain degree of selective poisoning of the catalyst and a decrease in the activity thereof. The catalyst desulfurizes the feed stock and, in general, may well tolerate high sulfur contents of the order of 2%, or more, without being particularly deactivated, but unless removed, is recycled with the hydrogen in the usual reforming operation and thus builds up in the gaseous phase to a total sulfur concentration of a higher magnitude which in turn reduces the dehydrogenation activity of the catalyst. The olefinic constituents of the gasoline, if subjected to reforming conditions tend to carbonize the catalyst. The nitrogen compounds of the gasoline fractions become converted under the catalytic reforming conditions, and it is believed that the resulting ammonia adversely poisons and deactivates the platinum-alumina combined halogen catalyst, apparently interfering with the halogen and reducing the hydrocracking activity of the catalyst.

It is thus a particular object of the present invention to provide a process for effecting the catalytic reforming of high nitrogen and sulfur content gasoline fractions in a manner which precludes the contamination and deactivation of the catalyst.

It is a further object of the invention to utilize a pre-hydrogenation and hydrocracking step, followed by separation and fractionation, in combination with and prior to effecting the catalytic reforming of those gasoline fractions having excessive nitrogen and sulfur contents, with a catalyst comprising platinum, alumina, and combined halogen.

It is also an object of the invention to provide in combination with a catalytic reforming operation, a pretreatment stage utilizing an improved mildly acid hydrogenation catalyst and a high hydrogen to hydrocarbon ratio, together with other suitable conditions of contact, that substantially avoids poisoning or deactivating the catalyst in the pre-treating stage, and to provide means for removing sulfur and nitrogen compounds from both the gaseous and liquid phases that are subsequently introduced into the catalytic reforming stage.

In one embodiment, my invention relates to catalytically hydrocracking and hydrogenating a gasoline fraction having a high sulfur and nitrogen content prior to effecting the catalytic reforming thereof in the presence of a catalyst containing platinum, alumina, and combined halogen in a manner which comprises, contacting the charge stream with a mildly acidic hydrogenation catalyst, particularly a halogen containing hydrogenation catalyst, in the presence of excess hydrogen at hydrogenating and hydrocracking conditions suitable to convert nitrogen compounds to ammonia, cooling the resulting stream and separating the latter into a hydrogen containing gaseous phase and a liquid phase, treating the gaseous phase to remove the sulfur and nitrogen containing materials from the hydrogen stream and separately fractionating the liquid phase to remove residual hydrogen sulfide and ammonia therefrom, mixing the resulting treated and fractionated streams and subsequently catalytic reforming the gasoline fraction with the aforementioned catalyst to provide a high octane fuel.

In a more specific embodiment, my invention relates to a process which comprises hydrogenation and hydrocracking a gasoline fraction of high sulfur and nitrogen content in the presence of hydrogen obtained as hereinafter set forth and a hydrogenation-hydrocracking catalyst of a mildly acidic nature effecting the contacting of the catalyst at a temperature of from about 500° F. to about 900° F. and a pressure greater than about 100 p. s. i., subsequently cooling the resulting hydrocracked and hydrogenated stream without substantial pressure reduction and separating the latter into a hydrogen containing gas phase and a liquid phase, treating the gaseous phase to substantially remove all the hydrogen sulfide and ammonia from the hydrogen, while separately fractionating the liquid phase to remove dissolved hydrogen sulfide and ammonia therefrom, subsequently mixing a resulting sulfur and nitrogen free-gasoline fraction with the separately treated hydrogen stream and effecting the reforming of said gasoline fraction in the presence of a catalyst comprising platinum, alumina, and combined halogen, at a temperature from about 750° F. to about 1000° F. and a pressure greater than about 100 p. s. i., cooling and separating the reformed stream and recovering an increased octane number gasoline stream and a hydrogen containing gaseous stream, and recycling at least a portion of the hydrogen stream into admixture with the charge gasoline fraction prior to effecting the pre-hydrogenating and hydrocracking thereof in the first stage of contact.

Where ordinary hydrogenation or hydroforming type catalysts, such as cobalt-molybdate, chromic acid, nickel, iron, etc., which may be deposited on carriers, such as alumina, or various other oxides, or gels, are employed in the first stage of catalyst contact, there may be effected a desired desulfurization of the charge stream, as well as substantially complete saturation of the olefins, to provide a part of the desired pre-treated stream which may be subsequently reformed to advantage. However, in the case of "coker" types of charge fractions, such as the naphtha and gasoline fractions which are prepared from California crudes that are high in sulfur and nitrogen, as well as olefinic hydrocarbons, all of which are detrimental to preferred types of reforming catalysts, there is not sufficient removal of the nitrogen to prevent the formation of ammonia during the reforming stage of contact and interference with the reforming operation, particularly the hydrocracking portion thereof. Thus, in accordance with an improved and preferred operation, such as provided by this invention, a hydrogenation catalyst with combined halogen, and particularly a platinum-alumina and combined halogen catalyst is utilized under controlled conditions to effect hydrogenation and desulfurization so that the olefinic hydrocarbons are converted, and sulfur substantially removed, while simultaneously effecting a hydrocracking action to crack and separate nitrogen as ammonia from the various nitrogen compounds. A phase separation and liquid fractionation as provided by the present invention, is also of advantage in removing substantially all of the nitrogen from the charge stream. A portion of the nitrogen is removed as ammonia from the gaseous hydrogen containing stream, the latter stream being treated to also remove $H_2S$, as well as nitrogen compounds, prior to being used in the reforming contact. Substantially all of the dissolved hydrogen sulfide and remaining portions of nitrogen are removed in a fractionation or stabilization column provided for the liquid phase, prior to passing the resulting gasoline fractions to the reforming stage. It may be further noted, that while in a preferred operation a platinum-alumina, combined halogen catalyst is used in both the pre-treating and reforming stages, that various of the metal oxide hydrogenation catalysts may have combined halogen to provide a desirable mildly acidic catalyst for the first stage of contact and be suitable to crack and separate the difficultly removable nitrogen from the charge stocks.

The effects of high nitrogen content as well as high olefinic content on the catalyst may be minimized to a large extent by utilizing somewhat different conditions of contact than those effected within the subsequent reforming stage. By pre-contact and separation of nitrogen in the form of ammonia from the charge stream, the catalyst in the second stage of contact may be utilized for long periods of time without undesirable deactivation. In general, it is preferable to use a somewhat lower temperature in the first stage of contact, with the hydrogenating catalyst, than that encountered in the second stage of contact. It is also desirable to utilize a high hydrogen to hydrocarbon ratio in order to prevent excessive carbon formation on the catalyst and a resulting deactivation thereof. The hydrogen to hydrocarbon ratio in the second stage of contact may lie within the range of from about 1.0 to about 8.0, however, in the first stage of contact a hydrogen to hydrocarbon molal ratio should be at least about 2:1. Also, it is preferable to utilize somewhat higher weight hourly space velocities in the first stage of contact than in the second stage thereof, wherein the resulting fractions are reformed to provide the high octane products. In general, the weight hourly space velocity, which is defined as the weight of hydrocarbon charge per hour per weight of catalysts in a reaction zone, may lie within the range of from about 0.5 to about 20, while in the first stage of contact, wherein a higher space velocity is utilized, the range may lie somewhere from about 1 to about 30.

In the usual single stage catalyst reforming operation, utilizing the present improved platinum-alumina and halogen catalyst, the dehydrogenation portion of the combined reaction taking place provides normally an excess of hydrogen so that the hydrogen is separated and recycled into admixture with the charge stream to provide hydrogen for the first portion of the catalyst contacting. In the combined operation of the present invention, it is a feature to recycle the entire hydrogen stream into admixture with the liquid fractions prior to the first stage of catalyst contact and provide the aforementioned desired high hydrogen to hydrocarbon ratio.

Charging stocks for the present improved operation, which have a high sulfur and nitrogen content, as well as olefinic hydrocarbons, are preferably those boiling within the gasoline range, and having an initial boiling point within the range of from about 50° to 100° F. and an end boiling point within the range of from about 325° to about 425° F., or it may be a selected fraction thereof which usually will be a higher boiling fraction, commonly referred to as naphtha, and generally having an initial boiling point within the range of from about 125° to about 250° F. and an end boiling point within the range of from about 350° F. to about 425° F. The stocks may, however, be straight run gasolines, natural gasolines or thermally cracked gasolines, or blends thereof.

The catalyst comprising platinum, alumina and halogen which are preferred for use in the present combined operation may contain substantial amounts of platinum, for economic as well as product yield and quality reasons, the platinum content usually will be within the range of from about 0.05% to about 1.5%. The preparation of the catalyst may, for example, be as set forth in my previously issued patent, No. 2,479,110, issued August 16, 1949. The concentration of halogen ion in the finished catalyst will be in the range of from about 0.1% to about 8% by weight of said catalyst. The combined halogen is preferably fluorine, since the fluoride ion appears to be somewhat more active in promoting hydrocracking than the other members of the halide group, and, therefore, somewhat smaller amounts of the fluorine ordinarily may be utilized in preparing the catalyst. However, both fluorine and chlorine may well be used in the finished catalyst as set forth in my aforementioned issued patent.

The exact manner in which the halogen or halide is present in the catalyst is not known, although it is believed to be present in the form of a chemical combination or loose complex with the alumina and/or platinum components. Because the exact chemical constitution of such halogen containing catalysts is not known, I sometimes refer to them as catalysts containing platinum, alumina, and halogen, or catalysts comprising platinum, alumina and combined halogen. The halogen-containing component of the catalyst appears to primarily promote isomerization and hydrocracking, and it further appears that the nitrogen compounds which form ammonia in the gasoline fraction more or less selectively poison the halogen-containing component, possibly by combination therewith resulting in removal of said component or relocation or rearrangement to a less active form. Thus, the pre-hydrocracking and removal of nitrogen and resulting ammonia is particularly desirable in connection with those charging stocks having excessive amounts of nitrogen, and pre-hydrogenation of the olefinic hydrocarbons to form more saturated compounds is also desirable to prevent rapid carbonization and deactivation of the catalyst.

The operation of the present invention and additional features and advantages thereof will be more apparent upon reference to the accompanying drawing and the following description thereof.

Referring now to the drawing, there is indicated a gasoline and/or naphtha charge being introduced at a superatmospheric pressure, preferably greater than 500 p. s. i. g., by line 1 and valve 2 into a heater 3, and this charge is subsequently mixed with recycle hydrogen being introduced into the heater 3 by way of line 4 and control valve 5, and obtained as hereinafter described. The gasoline or naphtha fractions which are processed in accordance with the present improved combined operation, are generally those having a high sulfur and nitrogen content. The nitrogen compounds particularly have a detrimental and deleterious effect to a single stage reforming operation, even though the latter utilizes a preferred type of reforming catalyst comprising platinum, alumina, and combined halogen, for the production of high yields of high octane gasoline stock. The charge stream is heated to a temperature of from about 500° F. to about 900° F. within heater 3, and preferably to a temperature of about 650° F. to about 800° F. Also, the hydrogen-hydrocarbon molal ratio is preferably greater than 2:1. The heated gasoline charge is withdrawn from heater 3 through line 6, and combined with the heated hydrogen passing by way of line 7. The combined streams flow into the pre-treating reactor 8.

In accordance with the present invention, reactor 8 contains a suitable mildly acidic hydrogenation catalyst such as cobalt-molybdena and various other metals and metal oxides alone or with suitable carriers, or preferably the aforedescribed platinum-alumina catalyst with combined halogen. The catalyst is continuously contacted by the gasoline stream in the presence of hydrogen at hydrogenation conditions. The resulting conversions and reactions effected within the reactor 8 are primarily exothermic, so that the gasoline stream is discharged from the lower end of reactor 8 by way of line 9 at a temperature higher than that introduced thereto.

The stream from reactor 8 passes by way of line 9 and control valve 10 into cooler 11, and is discharged from the latter by way of line 12 into a separator 13. In an alternative operation, pre-hydrogenated and hydrocracked gasoline stream from line 9 may pass, at least in part, through line 14 and valve 15 into a reboiler 16, and from the latter by way of line 17 back to line 9 for introduction into cooler 11. In this manner, the gasoline stream is cooled and the heat therefrom utilized at least in part for reboiling the liquid in fractionator 23.

The receiver or separator 13 receives the effluent stream from reactor 8 at a temperature and pressure whereby substantially only hydrogen, hydrogen sulfide, and some resulting ammonia are in the gaseous state. The hydrogen-containing gaseous stream is passed from separator 13 by way of line 18 and valve 19 and introduced into a gas treating zone 20. The liquid gasoline fractions, with some dissolved hydrogen sulfide and ammonia, the latter reresulting from the nitrogen that is cracked from the nitrogen-containing compounds of the charge stock, are passed by way of line 21 and control valve 22 into fractionator 23.

In the fractionator 23, the liquid fractions are distilled, fractionated and stabilized to provide a gasoline stream substantially free of all hydrogen sulfide and all resulting ammonia, whereby a sulfur and nitrogen free charge stream as an effluent from the fractionator may be withdrawn by way of line 24, valve 25, and pump 26 for transfer by way of line 27 to reforming heater 28. Gaseous hydrogen sulfide, ammonia, and perhaps very minor amounts of hydrogen and methane are discharged from the upper portion of fractionator 23 by way of line 29 and valve 30.

The present drawing indicates diagrammatically a gas treating zone 20 in which the hydrogen containing stream is subjected to removal of hydrogen sulfide and ammonia so that a substantially clean hydrogen stream may be transferred by way of line 31 and valve 32 into heater 28, wherein the hydrogen stream is heated to a high temperature for combination with the gasoline stream and for subsequent passage by way of line 33 and valve 34 into the catalytic reforming zone 35.

The ammonia in the hydrogen containing stream withdrawn from separator 13 may be removed by water scrubbing or other desired scrubbing process, while the hydrogen sulfide may be removed by any one of the usual procedures such as for example passing the gaseous stream over iron oxide, or alternatively, the stream may be passed through a standard Girbotol unit which is effective to remove all of the hydrogen sulfide from the hydrogen-containing stream. There is, of course, some pressure loss sustained in passing the charge stream through the first stage reactor 8 and through the various heat exchange and separating treating zones. However, the effluent streams from reactor 8 are withdrawn, cooled and treated without substantial or intentional pressure reduction. As indicated hereinbefore, the first stage of catalyst contacting as well as the catalytic reforming stage is effected at a superatmospheric pressure greater than at least 100 p. s. i. g., and preferably more than 500 p. s. i. g., and, therefore, for example, may be introduced at high pressure of the order of from 800 to 900 p. s. i. g. into the reactor 8, whereby resulting pre-treated gasoline and hydrogen streams may be introduced into the catalytic reforming reactor 35 at a pressure greater than 500 p. s. i. g. and preferably, of the order of about 700 p. s. i. g.

In accordance with the improved operation of the present invention, utilizing a platinum-alumina and combined halogen catalyst within the reforming reactor 35, the charge stream is passed from heater 28 at a temperature of about 750° to 1000° F. and preferably about 900° F., which is substantially higher than that temperature at which the charge stream is introduced into the pre-treating reactor 8. Only one catalytic reforming reactor is indicated in the present embodiment, however, the catalyst may of course be contained in one or more adiabatic reactors, and suitable interheaters or intermediate heating means provided to reheat the reactant stream between each of the reactors. Although fixed beds of catalyst may be used to advantage in the reactors as indicated in the present drawing, other types of contacting may be effected, such as for example in the fluidized, or fluidized-fixed bed, suspensoid, and moving bed methods of contacting a catalyst with the reactant stream.

The effluent from reactor 35 is passed by way of line 36 and valve 37, through a suitable cooler or heat exchanger 38 and into a receiver 39. Cooling is effected such that substantially only hydrogen is in the gaseous state within the receiver 39, and may be withdrawn by way of lines 40 and 45. The condensed hydrocarbons, consisting primarily of high octane number reformate and some normally gaseous hydrocarbons, my be withdrawn from receiver 39 by way of line 42 and valve 43 as a product stream.

As previously set forth, the present type of catalytic reforming operation normally provides an excess of hydrogen over and above that which may be continuously recycled to provide the hydrogen enriched atmosphere for the catalytic reforming, as well as the hydrogen necessary in the pre-hydrogenation and nitrogen-cracking step in accordance with the present combined operation of this invention. Hydrogen for recycle is withdrawn by way of line 45, valve 44 and compressor 46, the latter discharging a high pressure hydrogen stream to line 4, wherein it is suitably heated in the furnace 3 as hereinbefore set forth. Excess hydrogen is discharged through line 40 and valve 41.

In the second stage reactor 35, the paraffins in the charge stream are isomerized and hydrocracked and the naphthenes are dehydrogenated to aromatics. However, since the charge stream is desulfurized and de-nitrogenized, as well as substantially olefin free, after the pre-treatment or first stage catalyst contact, the catalyst in reactor 35 will exhibit a very long life without regeneration or replacement.

The following examples are given to further illustrate my improved processing operation.

*Example I*

A blended charging stock of California straight run naphtha and medium and high pressure distillates, having a high sulfur and nitrogen content and relatively high olefin content, was catalytically pre-treated with various catalysts of metals and metal oxides on an alumina base used in a fixed bed type of operation. The results are compared to the treatment of a rather similar type California charge stock over a platinum-alumina halogen catalyst under substantially similar operating conditions, and results of contact are set forth in the following table:

| | Charge Stock | 10% CoO-$MoO_3$ $Al_2O_3$ Base | 3% Ni on $Al_2O_3$ | 3% CO on $Al_2O_3$ | 3% Fe on $Al_2O_3$ | Charge Stock | Platinum-Alumina combined halogen, Pt 0.5%, F 0.3%, Cl 0.3% | Platinum-Alumina combined halogen, Pt 0.5%, F 0.3%, Cl 0.3% |
|---|---|---|---|---|---|---|---|---|
| Catalyst temp., ° F. (Average) | | 810 | 805 | 810 | 810 | | 430° C. | 430° C. |
| Pressure, p. s. i. g. | | 700 | 700 | 700 | 700 | | 700 | 700 |
| Weight hour space velocity | | 3.3 | 9.9 | 9.8 | 9.9 | | 6.0 | 6.0 |
| $H_2$/hydrocarbon (molal ratio) | | 0.6 | 0.6 | 0.6 | 0.6 | | 4.0 | 1.0 |
| Properties of charge stock and treated stock: | | | | | | | | |
| API gravity @ 60° F. | 41.5 | 51.1 | 50.3 | 50.3 | 50.4 | 46.0 | 52.0 | 50.3 |
| IBP, ° F. | 220 | 220 | 214 | 213 | 220 | 233 | 232 | 234 |
| E. P., ° F. | 395 | 395 | 400 | 402 | 395 | 398 | 396 | 397 |
| Nitrogen, p. p. m.[1] | 125+ | 14 | 98 | 105 | 123 | 73 | 3 | 6 |
| Bromine No. | 34 | 4 | 24 | 25 | 27 | 63 | 2 | 12 |

[1] P. p. m.—parts per million.

It will be noted that in general the various metal-alumina catalysts which are normally valuable hydrogenation-dehydrogenation catalysts are not particularly effective in removing nitrogen from the charge stock, although data is not given in the present example to indicate sulfur removal, these catalysts are generally recognized as being effective desulfurization catalysts. Of the non-halogen containing catalysts, the 10% CoO—$MoO_3$ alumina base catalysts was the most effective in separating and removing nitrogen from the charge stock, as well as effective in converting olefins, as indicated by the reduced bromine number. On the other hand the platinum-alumina, halogen catalyst was particularly effective in removing nitrogen, as well as being effective in converting the olefinic hydrocarbons, as indicated by the resulting low bromine number. Also, the latter catalyst was not excessively carbonized, as indicated by the low (0.47%) carbon deposit, while the others were excessively high in carbon deposition. Still further tests with a similar platinum-alumina combined halogen catalyst over longer periods of contact show carbon depositions that were substantially low, and indicative of long periods of use without regeneration or replacement. For example, in a 99 hour test only a 0.69% carbon deposition was formed when using a similar charging stock.

*Example II*

A charging stock of California straight run naphtha having a high sulfur and nitrogen content, as well as a relatively high content of olefinic content, was catalytically pre-treated by passing it over catalyst in a fixed bed type of operation. The properties of the charging stock, the operating conditions, and the resulting treated stock after contact with different catalysts are set forth in the following table:

| | Charge Stock | 0.3% pt., 0.65% F, $Al_2O_3$ Base | 0.3% pt., 0.08% F, $Al_2O_3$ |
|---|---|---|---|
| Catalyst temp., ° F., (Average) | | 815° F., 435° C. | 823° F., 439° C. |
| Pressure, p. s. i. g. | | 700 | 700 |
| Weight hour space velocity | | 6.0 | 6.0 |
| Hydrogen/hydrocarbon molal ratio | | 6.3 | 4.0 |
| Properties of Charge Stock and Treated Stock: | | | |
| API gravity @ 60° F. | 46.0 | 51.7 | 50.9 |
| I. B. P., ° F. | 233 | 214 | 248 |
| E. P., ° F. | 398 | 404 | 395 |
| Percent Sulfur | 2.45 | 0.12 | 0.07 |
| Nitrogen, P. P. M. | 73 | 4 | 41 |
| Bromine No. | 63 | 3 | 2 |
| Carbon on catalyst, weight percent | | .22 | 0.23 |

It can be seen by these tests that while the carbon deposition is quite low for each catalyst and there is thus little deactivation, that the platinum-alumina catalyst alone was not as nearly effective as the platinum-alumina and 0.65% fluorine catalyst in removing the nitrogen from the charge stock. Both catalysts were, however, quite effective in removing sulfur and converting olefins, the low resulting bromine numbers being indicative of the substantial conversion of olefinic hydrocarbons.

*Example III*

In a specific example of the improved combined operation of this invention, a Unisol sweetened California gasoline fraction comprising about 75.6 volume per cent Santa Maria "coker" distillate and 26.4% Los Angeles basin straight run naphtha and having an A. P. I. gravity of 50.1, an I. B. P. of 200° F. and an E. P. of 385° F., a sulfur content of 1.96%, a basic nitrogen content of .0054 weight percent, and a bromine number of 42.0 was charged to a pre-hydrogenation reactor containing a fixed bed of platinum-alumina, combined halogen catalyst, which was similar to that indicated in Example I. The contacting was effected at an inlet temperature of 700° F., a pressure of 600 p. s. i. g., a space velocity of 4.6, and a $H_2$/HC ratio of 7.5. The resulting product stream was cooled, separated and fractionated substantially in accordance with the present operation to provide a pre-treated, pre-saturated gasoline fraction for charging to the reforming reactor section. This fraction had a A. P. I. gravity of 57.6, sulfur content of .06%, a basic nitrogen content of .00052, and a bromine number of 2.8. It may thus be seen that sulfur was substantially removed as $H_2S$, that the $N_2$ content was reduced tenfold by fractionating out the resulting ammonia, and that the olefinic constituents were substantially converted to provide a saturated charge for the reforming stage. The catalyst in the hydrogenation reactor had only about 1% carbon content at the top of the bed after about one month of use. The subsequent contacting of the charge stream into the catalyst beds of the reforming section was effected at a higher inlet temperature of the order of 910° F., a pressure of 600 p. s. i. g., a space velocity of 2.09, and a resulting $H_2$/HC ratio of something less than 7.5.

The F-1 (Research Method) clear octane number of the charge stream was 66.7, and the F-1 clear octane number to the reforming reactor was 53.1, while the F-1 clear octane number of the final reformed product stream was 82.0. The F-1 plus 3 cc. of T. E. L./gal. octane number of the final product stream was 93.3.

I claim as my invention:

1. In the catalytic reforming of a gasoline fraction by contact with a catalyst comprising platinum, alumina and combined halogen, and wherein at least one of the catalyst components is deactivated by excessive amounts of sulfur and nitrogen contaminants present in the gasoline fractions, the method of preventing such deactivation which comprises, hydrogenating and hydrocracking the charge fraction in the presence of hydrogen and a hydrogenating catalyst and effecting the substantial conversion of said sulfur and nitrogen contaminants into hydrogen sulfide and ammonia, cooling the resulting contacted charge stream and separating the same into a hydrogen-containing gaseous phase and a liquid phase, treating and removing hydrogen sulfide and ammonia from said gaseous phase, separately fractionating said liquid phase and removing a light gaseous fraction containing hydrogen sulfide and ammonia therefrom, subsequently combining the treated hydrogen containing gaseous stream and the fractionated gasoline fraction and supplying the resultant mixture to the catalytic reforming step.

2. The method of claim 1 further characterized in that said hydrogenating catalyst comprises cobalt-molybdena-alumina and combined halogen.

3. The method of claim 1 further characterized in that said hydrogenating catalyst comprises platinum, alumina and combined halogen.

4. The method of claim 1 further characterized in that said hydrogenating catalyst comprises platinum, alumina and combined halogen, with platinum in an amount of from about 0.01% to about 1% by weight of said catalyst, and said halogen is in an amount of from about 0.1% to about 8% by weight of said catalyst.

5. A method for effecting the catalytic reforming of a gasoline fraction of high sulfur and nitrogen content, which comprises hydrogenating and hydrocracking said fraction in the presence of hydrogen and a hydroforming catalyst containing platinum, alumina and combined halogen, cooling the resulting stream and separating the latter into a hydrogen-containing gaseous phase and a liquid phase, treating said gaseous phase and substantially removing hydrogen sulfide and ammonia from the hydrogen, separately fractionating said liquid phase and removing hydrogen sulfide and ammonia therefrom, mixing the resulting sulfur and nitrogen free gasoline fraction with the separately treated hydrogen-containing stream and effecting the catalytic reforming of said gasoline fraction in the presence of said treated hydrogen-containing stream and of a catalyst comprising platinum, alumina and combined halogen at reforming conditions, separately recovering an increased octane number gasoline fraction and hydrogen from said reforming step, and commingling at least a portion of the hydrogen recovered from said reforming step with said sulfur and nitrogen containing charge gasoline fraction prior to hydrogenating and hydrocracking the latter as set forth.

6. A multiple stage process for the catalytic reforming of a gasoline fraction of high sulfur and nitrogen content which comprises, hydrogenating and hydrocracking said fraction in the presence of hydrogen and a hydroforming catalyst containing platinum, alumina, and combined halogen and at a temperature of from about 500° F. to about 900° F. and a pressure greater than 100 p. s. i. g., thereafter cooling the resulting hydrogenated and hydrocracked stream without substantial pressure reduction and separating the latter into a hydrogen containing gaseous phase and a liquid phase, treating the gaseous phase to substantially remove hydrogen sulfide and ammonia from the hydrogen, separately fractionating said liquid phase to remove hydrogen sulfide and ammonia and a minor amount of normally gaseous hydrocarbons therefrom, mixing the resulting sulfur and nitrogen free gasoline fraction with the separately treated hydrogen stream and catalytically reforming said gasoline fraction at a temperature from about 750° F. to about 1000° F. and a pressure greater than 100 p. s. i. g. in the presence of said treated hydrogen stream and a reforming catalyst comprising platinum, alumina and combined halogen.

7. The process of claim 6 further characterized in that a space velocity greater than that of the reforming stage is utilized in the first catalyst contacting stage and is within the range of from about 1 to 30.

8. The process of claim 6 further characterized in that excess hydrogen formed in the catalytic reforming of the gasoline fraction is separated therefrom and is combined with the high sulfur and nitrogen content gasoline fraction being introduced into the hydrogenation and hydrocracking stage.

9. The process of claim 6 further characterized in that said reforming catalyst contains platinum in an amount of from about 0.01% to about 1% by weight of said catalyst and halogen in an amount of from about 0.1% to about 8% by weight of said catalyst.

10. A process for improving a hydrocarbon fraction boiling in the gasoline range and having a high content of sulfur and nitrogen contaminants, which comprises contacting said fraction, in admixture with hydrogen, with a hydrogenating catalyst at a temperature of from about 500° F. to about 900° F. and a pressure in excess of about 100 pounds per square inch, thereby converting said contaminants into hydrogen sulfide and ammonia, separating the resultant products into a gas and a liquid, separating hydrogen sulfide and ammonia from the hydrogen content of said gas, fractionating said liquid to remove hydrogen sulfide and ammonia therefrom, commingling at least a portion of said hydrogen content of said gas with the fractionated liquid and subjecting the resultant mixture to reforming conditions in contact with a catalyst comprising platinum, alumina and combined halogen.

References Cited in the file of this patent

UNITED STATES PATENTS

| | | |
|---|---|---|
| 1,933,107 | Gohr | Oct. 31, 1933 |
| 2,325,034 | Byrns | July 27, 1943 |
| 2,411,726 | Holroyd et al. | Nov. 26, 1946 |
| 2,463,741 | Byrns | Mar. 8, 1949 |
| 2,479,110 | Haensel | Aug. 16, 1949 |
| 2,566,353 | Mills | Sept. 4, 1951 |
| 2,664,386 | Haensel | Dec. 29, 1953 |
| 2,691,623 | Hartley | Oct. 12, 1954 |